Aug. 18, 1953    R. TRACHTENBERG    2,649,543
PULSE SELECTION
Filed Sept. 28, 1951
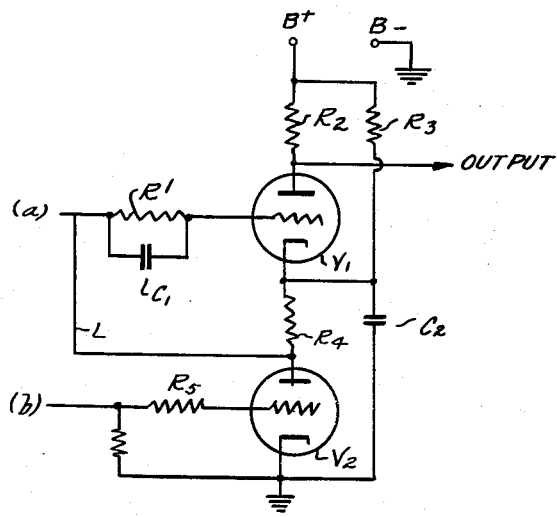
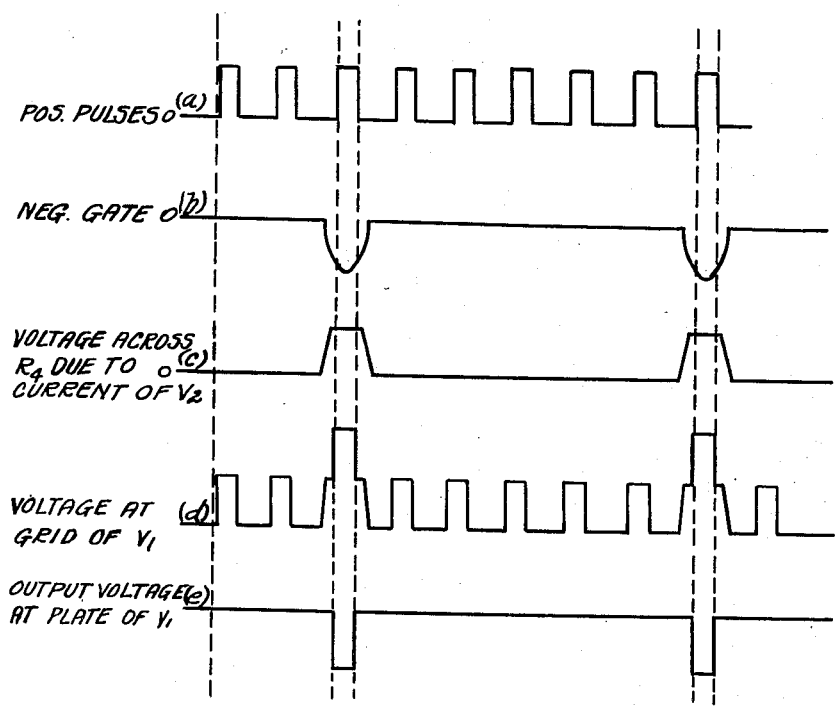
INVENTOR.
ROBERT TRACHTENBERG
BY
ATTORNEY AND
AGENT Patented Aug. 18, 1953

2,649,543

UNITED STATES PATENT OFFICE 2,649,543

PULSE SELECTION

Robert Trachtenberg, Camden, N. J., assignor to the United States of America as represented by the Secretary of the Air Force Application September 28, 1951, Serial No. 248,846

3 Claims. (Cl. 250—27)

The invention described herein may be manufactured and used by or for the Government for governmental purposes without payment to me of any royalty thereon.

This application concerns a pulse selection circuit for selecting a desired pulse from a series of narrow positive pulses. The circuit performs the dual function of shaping the keying pulses and, at the same time, selecting the ones of the more frequently recurring narrow pulses which coincide with the keying pulses and producing output pulses which correspond in time to the selected pulses.

The object of this invention is to shape a pulse and use it as a gate to select a narrower pulse from a series of such pulses.

Figure 1 discloses the circuit embodying applicant's invention.

Figure 2 shows various wave forms explanatory of the circuit of Figure 1.

The circuit comprising the invention utilizes a pair of triode vacuum tubes V1 and V2 serially connected. The plate of tube V1 is connected to the positive terminal of a potential source through a resistor R2. The cathode of tube V1 is connected by means of a resistor R4 to the plate of tube V2 while the cathode of tube V2 is grounded. A series of narrow positive pulses (see Fig. 2a) is applied to the grid of tube V1 through a parallel network comprising a resistor R1 and capacitor C1. The junction of R1 and C1 remote from the grid of tube V1 is connected directly to the plate of V2 via lead L. A source of negative gate pulses (see Fig. 2b) is applied to the grid of tube V2 through a network including resistor R5. Resistor R5 is a grid current limiting resistor in the event that positive pulses are present at the grid of tube V2. Resistor R3 is connected between the cathode of tube V1 and the positive terminal of the potential source. The junction of R3 and R4 is by-passed by capacitor C2. One terminal of capacitor C2 is connected to the junction of R3 and R4 and the other terminal of capacitor C2 is connected to ground. An output (see Fig. 2e) is derived from the plate of tube V1.

Operation

The pulse which is used for gating shown in Figure 2b, is supplied to the grid of tube V2 in negative polarity. Tube V2 is normally (in the absence of gate pulses) conducting and current flows from B+ through resistors R3 and R4 and tube V2 to ground. Upon application of the negative gate pulse to the grid of tube V2, V2 is cut off and a flat-topped voltage pulse, represented by Figure 2c, appears across resistor R4 in such a direction as to make tube V1 conduct.

A series of positive pulses, illustrated in Figure 2a, is introduced into the grid circuit of tube V1. At the grid of V1 the one pulse which is in timed coincidence with the gate pulse reaches a higher positive potential than the other pulses (see Figure 2d) and causes grid current flow in tube V1 which charges C1. The time constant R1, C1 is high compared to the interval between gating pulses and tube V1 is cut off by the charge on C1 except when the selected pulse is present. Pulses appearing across resistor R2 coincide with the selected pulses.

The impedance that the circuit presents to the source of positive pulses consists of three parallel elements, (1) the parallel combination of R1 and C1 in series with the grid of V1, (2) R4 in series with by-pass capacitor C2, and (3) the plate resistance of V2; the plate resistance of V2 increases during the time that tube V2 is cut off by the negative gate pulse. Consequently, the circuit presents higher shunt impedance to the source of positive pulses during the presence of the negative gate pulses. This tends to make the positive pulses which are to be selected greater in amplitude than the other positive pulses at the input to the circuit and aids in pulse selection.

The voltage drop existing across resistor R4 because of current flow in V2 is added to the selected pulse of the series of positive pulses applied to the grid of tube V1 to give a resultant voltage at the grid of tube V1 as shown in Figure 2d. The output voltage at the plate of tube V1 is in phase opposition to the voltage at the grid, and is shown in Figure 2e.

The shape of the negative pulses supplied to the grid of tube V2 is not critical provided these pulses exceed the voltage required to cut off tube V2. Positive pulses at the grid of tube V2 will not affect circuit operation and the resistor R5 may be used to limit grid current if positive pulses are present. Consequently, pulses obtained by differentiating a square wave may be supplied to the grid circuit of tube V2.

I claim as my invention:

1. A pulse selection circuit for selection of a desired pulse from a series of such pulses with the aid of gating pulses, comprising a first vacuum tube having a cathode, control grid and anode; a second vacuum tube having a cathode, control grid and anode, a first resistor connected between the cathode of said first vacuum tube and the plate of said second vacuum tube, a second resistor connected between the anode and cathode of said first vacuum tube, means for applying said series of pulses to the control grid of said first vacuum tube, means for applying said gating pulses to the control grid of said second vacuum tube, an output circuit associated with said first vacuum tube for deriving a selected output pulse during the coincidence of said series of pulses and said gating pulses.

2. A pulse selection circuit for selecting a desired pulse from a series of pulses with the aid of periodically repeating gating pulses, said circuit comprising first and second vacuum tubes each having an anode, a cathode and a control grid; a source of direct potential; a series circuit connected between the positive terminal of said source and its negative terminal comprising a first resistance, the anode-cathode path of said first tube, a second resistance and the anode-cathode path of said second tube in the order named; a resistance connected between the positive terminal of said source and the cathode of said first tube; a by-pass condenser connected between the cathode of said first tube and the negative terminal of said source; a network consisting of a resistance and a capacitance in parallel connected between the grid of said first tube and the anode of said second tube, said network having a time constant that is long relative to the interval between gating pulses; means for applying said series of pulses between the anode and cathode of said second tube with polarity such as to drive said anode in a positive direction; means for applying said gating pulses between the grid and cathode of said second tube with polarity such as to drive said grid in a negative direction; and an output circuit coupled to the anode of said first tube.

3. A pulse selection circuit for selecting a desired pulse from a series of pulses with the aid of periodically repeating gating pulses, said circuit comprising: first and second electron tubes each having an anode, a cathode and a control grid; means for supplying direct current to the anode-cathode circuits of said tubes; means for biasing the grid of said first tube negatively with respect to its cathode by an amount proportional to the anode current of said second tube; means for applying said series of pulses to the grid of said first tube in proper polarity to increase the anode current of said first tube; means for also applying said series of pulses between the anode and cathode of said second tube; means for applying said gating pulses to the grid of said second tube in proper polarity to decrease the anode current of said second tube; and a network comprising a resistance shunted by a capacitance connected in series with the grid of said first tube, the time constant of said network being long as compared to the interval between gating pulses.

ROBERT TRACHTENBERG.

References Cited in the file of this patent
UNITED STATES PATENTS

| Number | Name | Date |
|---|---|---|
| 2,609,533 | Jacobsen | Sept. 2, 1952 |

FOREIGN PATENTS

| Number | Country | Date |
|---|---|---|
| 963,498 | France | Jan. 4, 1950 |